(12) United States Patent
Lee (10) Patent No.: US 10,139,887 B2
(45) Date of Patent: Nov. 27, 2018

(54) METHOD OF CONTROLLING POWER AND ELECTRONIC DEVICE THEREOF

(71) Applicant: Samsung Electronics Co., Ltd., Gyeonggi-do (KR)

(72) Inventor: Seok-Woo Lee, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 974 days.

(21) Appl. No.: 14/254,135

(22) Filed: Apr. 16, 2014

(65) Prior Publication Data

US 2014/0306553 A1 Oct. 16, 2014

(30) Foreign Application Priority Data

Apr. 16, 2013 (KR) ........................ 10-2013-0041899

(51) Int. Cl.
*H02H 11/00* (2006.01)
*G06F 1/32* (2006.01)
*H04B 1/3827* (2015.01)
*H04M 1/04* (2006.01)

(52) U.S. Cl.
CPC .......... *G06F 1/3231* (2013.01); *G06F 1/3234* (2013.01); *G06F 1/3278* (2013.01); *H04B 1/3838* (2013.01); *H04M 1/04* (2013.01); *Y02D 10/157* (2018.01); *Y02D 10/173* (2018.01)

(58) Field of Classification Search
CPC .... G06F 1/3231; G06F 1/3234; G06F 1/3278; H04B 1/3838; Y02B 60/126; Y02B 60/1289; H04M 1/04; Y02D 10/157; Y02D 10/173

USPC ........................ 307/326; 345/156; 710/15, 19
See application file for complete search history.

(56) References Cited

U.S. PATENT DOCUMENTS

| 7,146,139 B2 | 12/2006 | Nevermann |
| 7,499,722 B2 | 3/2009 | McDowell et al. |
| 2002/0016155 A1 | 2/2002 | Charbonnier |
| 2008/0142129 A1* | 6/2008 | Reasner ................. A45C 11/32 150/131 |
| 2008/0167834 A1 | 7/2008 | Herz et al. |

(Continued)

FOREIGN PATENT DOCUMENTS

| CN | 102098243 A | 6/2011 |
| CN | 102156510 A | 8/2011 |

(Continued)

OTHER PUBLICATIONS

Canadian Search Report, dated Jun. 13, 2016.

(Continued)

*Primary Examiner* — Richard Tan
(74) *Attorney, Agent, or Firm* — Cha & Reiter, LLC.

(57) ABSTRACT

A portable electronic device supporting wireless electronic communication comprises a display, at least one sensor device, a protective cover and a processor. The protective cover is mounted to selectively cover portions of the display and the at least one sensor device detects an object located in proximity of the electronic device. The processor controls transmission power in response to detection of the object located in proximity of the electronic device by the sensor device and in response to an operation mode associated with the protective cover.

9 Claims, 8 Drawing Sheets

(56) References Cited

U.S. PATENT DOCUMENTS

| | | | |
|---|---|---|---|
| 2009/0295648 A1* | 12/2009 | Dorsey | H01Q 1/2266 343/702 |
| 2009/0305742 A1* | 12/2009 | Caballero | H04B 1/3838 455/566 |
| 2012/0142393 A1 | 6/2012 | Won et al. | |
| 2012/0172085 A1 | 7/2012 | Vuppu et al. | |
| 2013/0076614 A1 | 3/2013 | Ive et al. | |
| 2013/0214887 A1 | 8/2013 | Lauder et al. | |
| 2013/0271342 A1 | 10/2013 | Shen | |
| 2014/0210803 A1* | 7/2014 | Oh | G09G 3/20 345/207 |

FOREIGN PATENT DOCUMENTS

| | | |
|---|---|---|
| KR | 10-2008-0047938 A | 5/2008 |
| KR | 10-2012-0067095 A | 6/2012 |
| KR | 1020130010051 * | 1/2013 |
| KR | 10-2013-0018393 A | 2/2013 |

OTHER PUBLICATIONS

Australian Search Report, dated Aug. 9, 2016.
European Search Report, dated Oct. 25, 2016.
Australian Search Report, dated Nov. 22, 2016.
Chinese Search Report dated Feb. 27, 2017.
Canadian Search Report dated Mar. 8, 2017.
India Search Report dated Aug. 31, 2018.

* cited by examiner

METHOD OF CONTROLLING POWER AND ELECTRONIC DEVICE THEREOF

CLAIM OF PRIORITY

This application claims priority under 35 U.S.C. § 119 to an application filed in the Korean Intellectual Property Office on Apr. 16, 2013 and assigned Serial No. 10-2013-0041899, the contents of which are incorporated herein by reference.

BACKGROUND

1. Technical Field

The present system concerns control and management of power in an electronic device.

2. Description of the Related Art

An electronic device comprising a mobile terminal such as a "smart phone" includes a screen touch-type display module and a high pixel resolution camera module to capture still pictures and moving pictures and provides communication with a calling/called party. In addition, the mobile terminal may play back multimedia content, such as music and moving pictures and connect to a network for web surfing. Such a mobile terminal is typically equipped with a high-performance processor to perform various functions. A separate protective case is often used to protect appearance and function of an electronic device as well as to improve grip and feel. Such a protective cover is typically made of a material having appropriate texture and is used to protect a touchscreen on the front side of the electronic device.

Electronic devices also are configured to reduce specific absorption rate (SAR) of electromagnetic radiation reaching a human body. For example, SAR represents an electromagnetic absorption power per unit mass absorbed in the human body when a mobile terminal is used. A measured value of the SAR exceeding a reference value may indicate a safety impairment for a user. Different countries regulate SAR of devices by setting a reference value with respect to the human head. In Korea, the SAR reference value is 1.6 (W/Kg), which is identical to that of the U.S.A. In Japan and the E.U., the SAR reference value is 2.0 (W/Kg). The SAR requirement may reduce transmission power of an electronic device capable of performing communication and degrade performance of the electronic device.

SUMMARY

A system controls communication power to dynamically and selectively reduce specific absorption rate whilst maintaining effective electronic device operation even when a protective cover is used. Specifically, the system controls transmission power associated with a corresponding function even when a protective cover is closed or an object is detected adjacent to the electronic device decreasing a specific absorption rate (SAR). The system controls power in response to an operation mode of the electronic device.

A portable electronic device supporting wireless electronic communication comprises a display, at least one sensor device, a protective cover and a processor. The protective cover is mounted to selectively cover portions of the display and the at least one sensor device detects an object located in proximity of the electronic device. The processor controls transmission power in response to detection of the object located in proximity of the electronic device by the sensor device and in response to an operation mode associated with the protective cover.

In a feature, the sensor device is a hall sensor for detecting a magnetic power of a magnet disposed in the protective cover which includes one or more transparent windows. Alternatively, the sensor device is at least one of, a proximity sensor and image sensor, for detecting closure of the protective cover to encompass at least a portion of the electronic device. The processor maintains the power at a default power value when it is identified that the electronic device is in a non-contact mode in which closure of the protective cover to encompass at least a portion of the electronic device is detected and the electronic device is not in physical contact with a human body. The non-contact mode includes one or more of a Bluetooth mode, a speaker-phone mode, an ear-phone mode, an infrared communication mode, a Near Field Communication (NFC) mode, a wireless LAN communication mode, a Zigbee communication mode and a communication mode enabling voice communication to be performed.

In another feature, the processor reduces transmission power by a predetermined value when closure of the protective cover to encompass at least a portion of the electronic device is detected and it is identified that the electronic device is in contact with a human body e.g. a head. Further, the processor enables the display to display status information of the electronic device through the transparent window when the protective cover is closed and encompasses at least a portion of the electronic device. The status information comprises at least one of, battery charge remaining information, weather information, time information, message reception and confirmation information, current mode indication information and transmission power information.

In a further feature, a method employed by the portable electronic device determines whether a protective cover for the electronic device is closed and encompasses at least a portion of the electronic device; identifies a current operational mode of the electronic device when the protective cover is closed; and controls power of the electronic device in response to the identified current operational mode. The method performs power back-off by reducing the power by a predetermined value before identification of a current operational mode of the electronic device.

In an additional feature, the portable electronic device comprises a housing including a display and a processor included within the housing. The processor identifies a current operational mode and controls transmission power in response to the identified mode when an external object is at least one of, (a) adjacent to and (b) covers at least a part of the display.

BRIEF DESCRIPTION OF THE DRAWINGS

The above features and advantages of the system will become more apparent from the following detailed description when taken in conjunction with the accompanying drawings in which.

DETAILED DESCRIPTION

Exemplary embodiments will be described herein below with reference to the accompanying drawings. Detailed descriptions of well-known functions or configurations will be omitted since they would unnecessarily obscure the subject matter. The terms used herein should be understood based on the descriptions made herein.

Various embodiments of the present disclosure will be described based on an assumption that an electronic device performs an input process using an input device and a display process using a display unit on one physical screen. In the following description, the term "display unit" may be also be referred to as "a display". Therefore, although the display unit and the input device are illustrated separately in the configurations of a device according to various embodiments of the present disclosure, the display unit may include the input device or the input device may include the display unit. In addition, according to various embodiments of the present disclosure, the display unit may be described as a touchscreen (device).

In addition, various embodiments of the present disclosure may be applied to various types of electronic devices besides an electronic device including a touchscreen. For example, the various embodiments may be applied to an electronic device in which the display unit and the input device are physically separated or distinguishable from each other.

In the following description for various embodiments of the present disclosure, an electronic device will be illustrated and described, which includes a touchscreen as a display unit and a protective cover that protects the touchscreen. The electronic device may include various types of devices including a touchscreen, such as a personal digital assistant (PDA), a laptop computer, a mobile phone, a smart phone, a netbook, a mobile internet device (MID), an ultra mobile personal computer (UMPC), a tablet PC, a navigation device, and an MP3 player.

Figure 1:
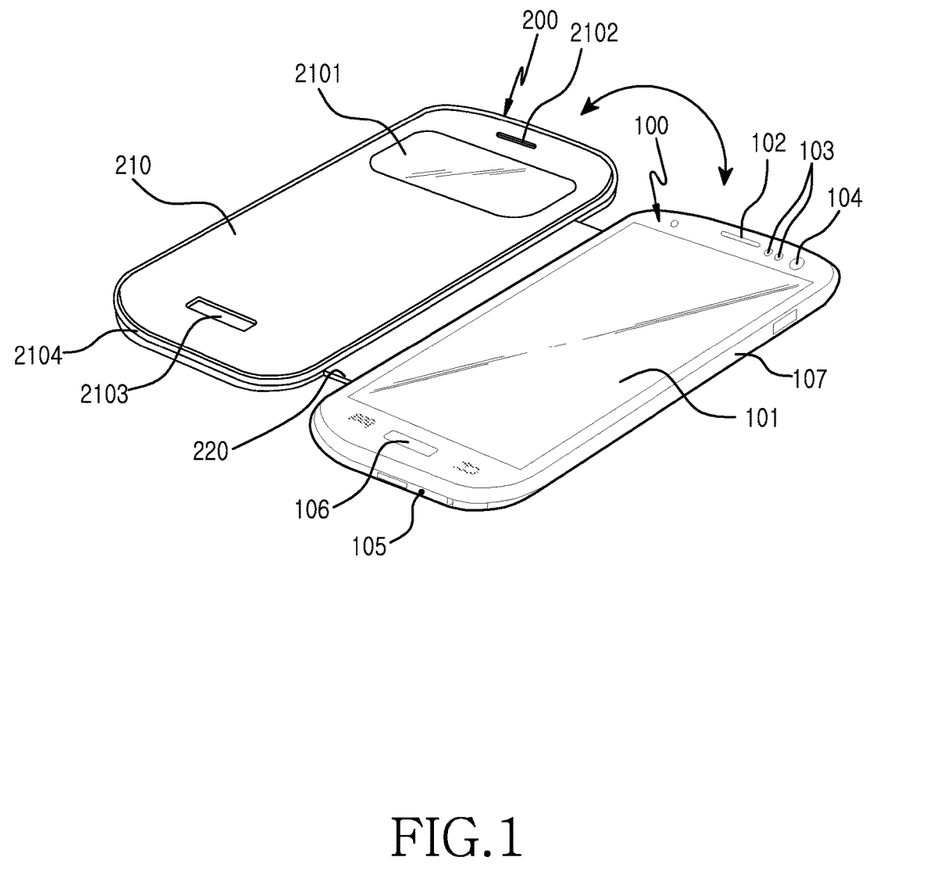
FIG. 1 shows an electronic device having a protective cover according to invention principles.
Figure 2:
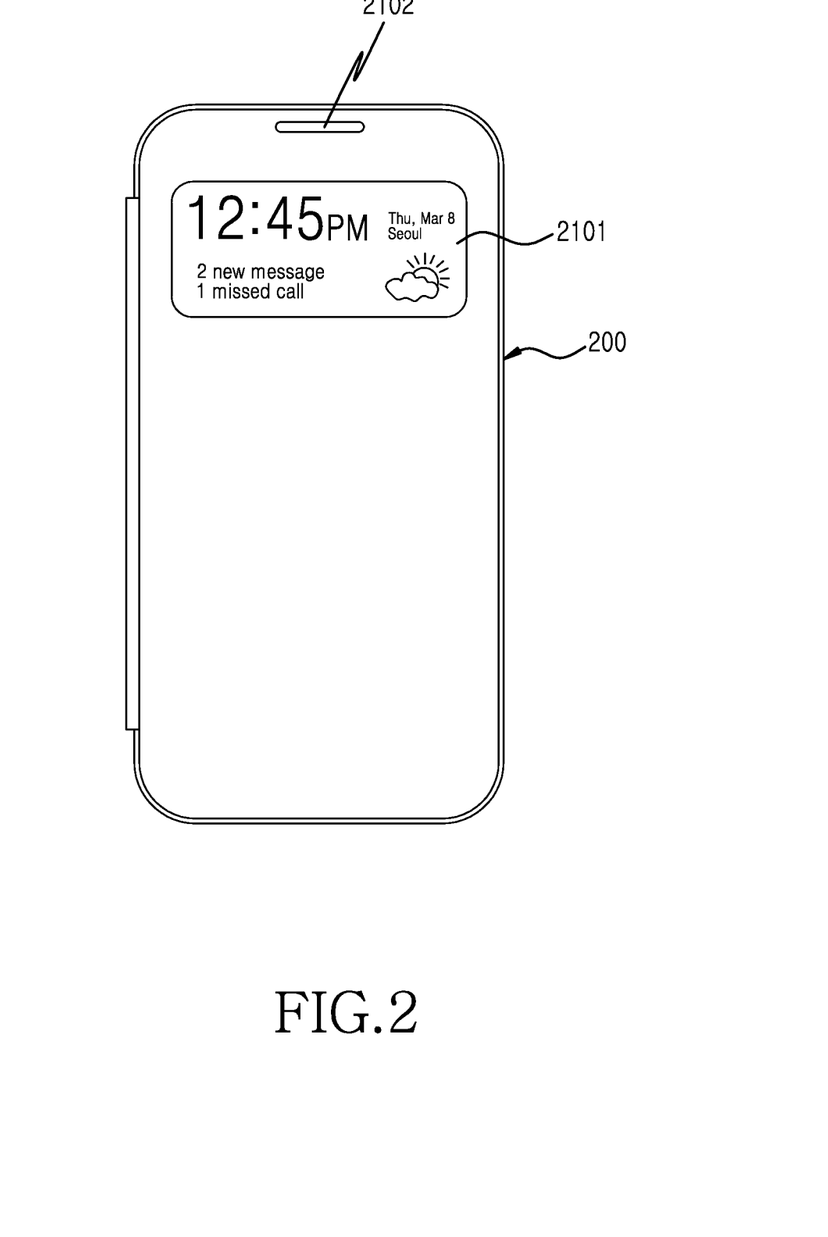
FIG. 2 shows an electronic device with a closed protective cover according to invention principles.
Figure 3:
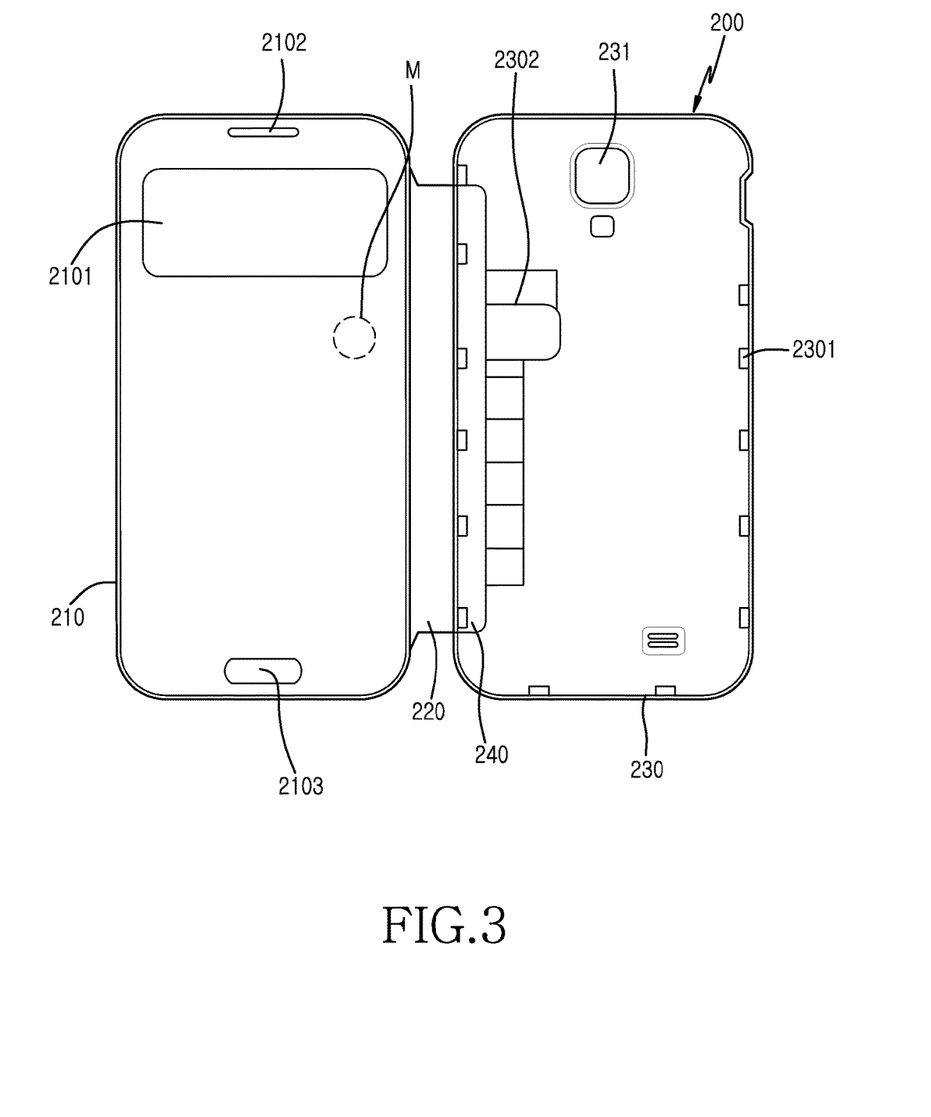
FIG. 3 shows a protective case having a protective cover according to invention principles.

FIG. 1 shows an electronic device having a protective cover. FIG. 2 shows a closed protective cover. FIG. 3 shows a protective case having a protective cover. Referring to FIGS. 1 to 3, an electronic device 100 that is protected by a protective case 200 may include a touchscreen 101, a speaker module 102 disposed above the touchscreen 101, a plurality of sensors 103 disposed in one side of the speaker module 102, a camera module 104 disposed in one side of the sensors 103, and a microphone 105 disposed below the touchscreen 101. Separate other components may be further included. Among the above-described components, one or more components may be omitted except for the touchscreen. The electronic device 100 may be protected by the protective case 200 which is connected or attached thereto in a folder type, sliding type or a flip type configuration. The protective case 200 may include a support cover 230 which supports the rear side of the electronic device 100, a protective cover 210 which protects the front side of the electronic device 100 and a connection portion 220 for connecting the protective cover 210 to the support cover 230.

The protective cover 210 may be mounted to be connected to the support cover 230 and the connection portion 220 and to be pivotable in a direction shown by an arrow in FIG. 1. The protective cover 210 may be placed on the touchscreen 101 to protect the touchscreen 101 of the electronic device 100 as illustrated in FIG. 2, or may be in a state as illustrated in FIG. 1 to enable a user to use the electronic device 100. Herein, the closed state refers to a state in which the protective cover 210 is pivoted from the support cover 230 and is overlapped with the touchscreen 101, and the opened state refers to a state as illustrated in FIG. 1 in which the protective cover 210 is pivoted from the support cover 230 to enable a user to use the electronic device 100 by directly touching the touchscreen 101 of the electronic device 100.

Transparent window 2101 is provided in a part of the protective cover, enabling a part of the touchscreen 101 to be seen by a user when the protective cover 210 is in the closed state. Therefore, the electronic device 100 detects that the protective cover 210 is in the closed state as illustrated in FIG. 2 and displays state information of the electronic device on a region of the touchscreen 101 that corresponds to the transparent window 2101, thereby enabling a user to use the electronic device through the transparent window 2101 even when the protective cover 210 is in the closed state. Although the transparent window 2101 is shown in an upper part of the protective cover 210, the window may be located elsewhere on the touch screen. A plurality of transparent windows may be provided respectively at different locations to enable display of information and the transparent window 2101 may be configured to have an area not exceeding 50% of the overall area of the protective cover.

At least one button recommendation slot 2103 is formed in one surface of the protective cover 210 which faces the touchscreen 101 of the electronic device 100, thereby preventing a protruding key button 106 of the electronic device 100 from being pressed by the protective cover 210 that is in the closed state. In addition, a stepped portion 2104 is formed in the rim of the surface of the protective cover 210 which faces the touchscreen 101 to allow the user to easily open the protective cover 210 by picking up the stepped portion using a finger nail, for example, when the protective cover 210 is closed. The protective cover 210 is formed to have a size corresponding to that of the touchscreen 101 but may be formed in a shape that enables the side 107 of the electronic device 100 to be protected when the protective cover 210 is closed by extending and bending one end of the protective cover 210. In addition, the protective cover 210, connection portion 220 and support cover 230 of the protective case 200 may be configured to have corresponding structures to various key buttons, protruding or recessed elements, and elements required to be exposed to the outside which are applied to the electronic device 100. In addition, the protective case 200 may be waterproof. The support cover 230 may include a plurality of tension protrusions 2301 formed at specific intervals along the inner edge thereof. The electronic device 100 may be detachably assembled with the support cover 230 such that the tension protrusions are fitted into tension grooves (not illustrated) formed to correspond to the tension protrusions in the rear surface of the electronic device 100.

The support cover 230 may be formed of a synthetic resin material, but may be formed of, different materials, such as a metal material, graphite fiber reinforced polymer (GFRP), carbon fiber reinforced polymer (CFRP), rubber, silicon, PC, PC_ABS, or PC_GF. The support cover 230 may be formed as a battery cover which is directly assembled with the rear surface of the electronic device, but may also be a separate injection molded part which is configured separately from the electronic device 100 and accommodates the rear surface of the electronic device 100. The support cover 230 may include an opening 231 formed therein. A component mounted in the rear surface of the electronic device 100, for example, a camera module may be exposed through the opening 231. In this case, various accessories, such as an effect filter or a gray card for white balance, may be further applied to the inner or outer sides of the support cover 230 through the opening 231.

A magnet M may be disposed in the protective cover 210, and a magnetic sensing unit comprising a hall sensor or a reed switch, for example, for detecting the magnetic force of the magnet M may be mounted at a location corresponding to the magnet M in the electronic device 100. The magnetic sensing unit may be mounted at a location at which the magnetic force of the magnet M is detected in the electronic device when the protective cover 210 is closed and in contact with the display 101 of the electronic device 100. The protective cover 210 may be also pivoted in a direction to cover the support cover 230 of the electronic device 210 in the rear side of the support cover 230, similarly to a direction to cover the display 101 of the electronic device 100, via flexibility of the connection portion 220. Therefore, even though the protective cover is pivoted in the direction in which the protective cover covers the rear side of the support cover 230 rather than being closed, the electronic device 100 may recognize the protective cover 210 as being closed due to the magnetic field of the magnet M mounted in the protective cover 210. Therefore, a shielding portion 2302 may be required to protect the magnetic force of the magnet M from being detected when the protective cover 210 is pivoted in the direction to cover the support cover 230.

The shielding portion 2302 may be disposed at a location corresponding to the magnet M of the protective cover 210 in the support cover 230 when the protective cover 210 is pivoted in the direction to cover the rear side of the support cover 230 as illustrated in FIG. 3. The shielding portion 2302 may be made of various materials having a shielding layer for shielding the magnetic force of the magnet and may be a sheet-shaped shielding material disposed at the corresponding location of the support cover 230. A material which the shielding portion 2302 is made of may include alloys having magnetic permeability, such as Fe-based alloy (amorphous) and Ni-based or Co-based alloy. When the protective cover 210 is closed in a way to cover the touchscreen 101 of the electronic device 100, the electronic device 100 may detect that the protective cover is closed by using one or more sensors. For example, the sensors may comprise a proximity sensor or an image sensor, for example, which is disposed in the front side of the electronic device 100 and detects the closing of the protective cover 210.

In response to the electronic device detecting the proximity of an object to the proximity sensor or image sensor where the electronic device is connected to a counterpart device, the electronic device advantageously recognizes proximity of a human head and decreases a transmission power value, thereby reducing a specific absorption rate in the human body. For example, in a case where an initial default transmission power value 29.5 dBm, when the proximity sensor detects the proximity of the object, the electronic device recognizes a human body as being in proximity and decreases the transmission power to 22.5 dBm to reduce the specific absorption rate. In addition, when the protective cover is closed, the electronic device recognizes proximity of the human body and decreases the transmission power. However, where the protective cover is closed in the electronic device, the human body may be not in proximity to the electronic device and may be using a Bluetooth communication mode, a speakerphone mode, an earphone mode, a Peer to Peer (P2P) mode, for example. In this condition, the transmission power is decreased unnecessarily, causing performance loss, and signal degradation, in the electronic device.

Although the protective cover is closed or an object is detected around the electronic device, the electronic device identifies whether the electronic device is in a non-contact mode in which the electronic device is not in contact with a human body and, when in non-contact mode, advantageously does not decrease transmission power, thereby preventing performance loss.

Figure 4:
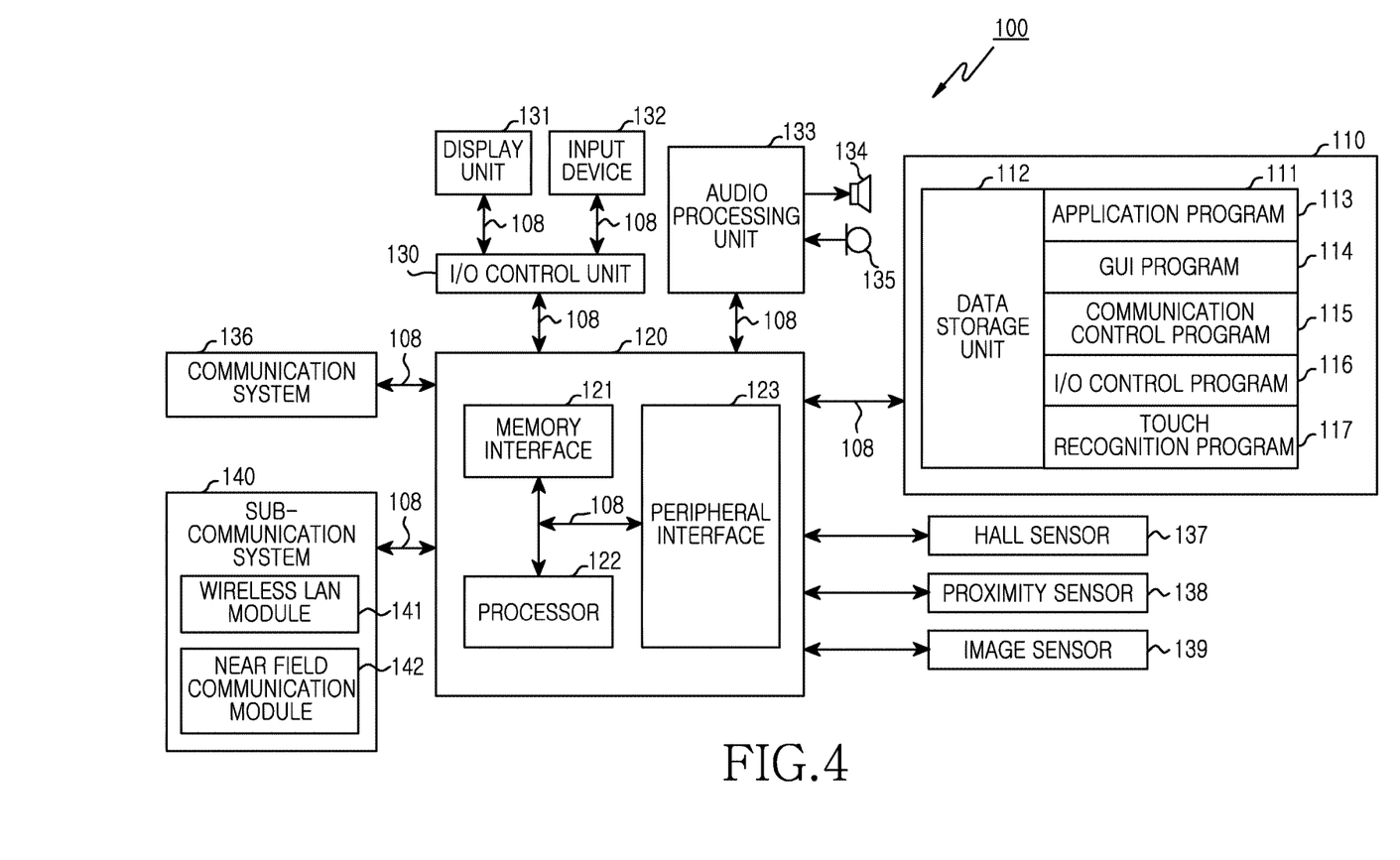
FIG. 4 shows an electronic device according to invention principles.

FIG. 4 shows an electronic device that detects whether the protective cover of the protective case is closed. For example, the magnetic force of a magnet mounted in the protective cover of the protective case may be detected by the hall (or other) sensor provided at a corresponding location of the electronic device. A proximity sensor or image sensor mounted in the front side of the electronic device detects whether or not the protective cover is closed. Further, a sensing unit may be located within the electronic device in order to detect an object targeted for detection. A configuration of the electronic device having the above-described configuration is described with reference to FIG. 4. The electronic device 100 may include a memory 110, a processor unit 120, an input/output (I/O) control unit 130, an input device 132, an audio processing unit 133, a communication system 136 and a sub-communication system 140. The respective components may communicate with each other through one or more communication buses or signal lines 108.

The memory 110 may include a program storage unit 111 for storing a program for controlling operation of the electronic device 100 and a data storage unit 112 for storing data generated during the execution of a program, and may store data for example, generated by the program according to the operation of the processor 122. For example, the data storage unit 112 may store database information which may be used in executing programs in response to data received via a touch recognition control program 117 executed by the processor 122. The received data, may comprise settings information required to configure GUI operations, in a process of displaying the related programs on the display unit 131. The program storage unit 111 may include an application program 113, a graphic user interface (GUI) program 114, a communication control program 115, an input/output control program 116, and a touch recognition control program 117. In this case, the programs stored in the program storage unit 111 comprise executable instructions of an instruction set. The application program 113 may include a software component for at least one application program installed in the electronic device 100. The GUI program 114 may include at lease one software component for providing a graphical user interface on a display unit 131. For example, the GUI program 113 may display information about application programs executed by the processor 122 on the display unit 131.

The electronic device 100 may display information in a region corresponding to the transparent window 2101 of the protective cover in the display unit 131 in the state where the protective cover 210 of the protective case 200 is closed. In response to the electronic device 100 identifying that the electronic device 100 is in a non-contact mode and the protective cover 210 of the protective case 200 is closed, the electronic device 100 may display information status through the transparent window 2101 of the protective cover 210. For example, the status information may include battery status information, weather information, and time information. In addition, the status information may include, transmission/reception operation data, message reception and confirmation data and non-contact mode data such as data concerning one or more of a Bluetooth mode, a speaker-phone mode, an ear-phone mode, and a Peer to Peer (P2P) mode, in which the electronic device is not in contact with a user body.

The communication control program 115 may include at least one software component for controlling communication with one or more other electronic devices using the communication system 136 and/or the sub-communication system 140. For example, the communication control program 115 may search for other electronic devices for establishing communication connection. In response to identifying a second electronic device for communication connection, the communication control program 115 establishes a communication connection with the second electronic device. The communication control program 115 performs a discovery function to identify capabilities of identified devices and session establishment procedures for connecting to the identified devices and transmits and receives data to and from the other devices through the communication system 136. In addition, the communication control program 115 may be used to determine whether the electronic device is communicating and in a contact mode or in a non-contact mode.

The I/O control program 116 may display operations of the electronic device 100 on the display unit 131 and receive operation instructions for device 100 via input device 132. The touch recognition control program 117 may include at least one software component for determining a function in response to touch information input via the upper portion of the protective cover when a cover touch mode is activated in response to command by the processor 122. In addition, a software component provides a function for displaying information limited to a region corresponding to the transparent window area in the display unit in response to detection of a cover touch mode. The memory 110 included in the electronic device 100 may comprise multiple memory devices. In addition, the memory 110 may perform a function of the program storage unit 111 or the data storage unit 112 or both functions in response to a device 100 operating application. The physical division between internal storage areas in the memory 110 may be not definite and be virtual.

The processor unit 120 may include a memory interface 121, at least one processor 122, and a peripheral interface 123. In this case, the memory interface 121, the at least one processor 122 and the peripheral interface 123 which are included in the processor unit 120 may be integrated into at least one circuit or be implemented as separate components. The memory interface 121 may control access to the memory 110 components, such as by processor 122 or by peripheral interface 123. The peripheral interface 123 may control connections of the input/output peripherals of the electronic device 100 to the processor 122 and the memory interface 121. The processor 122 enables the electronic device 100 to provide services, such as multimedia or communication services, using at least one software program, performs display on the display unit 131 enabling user control of device operation via a GUI through the I/O processing unit 130. The processor 122 provides instructions received from the outside of the electronic device 100 through the input device 132 and executes at least one program stored in the memory 110 to provide a service.

The processor 122 receives information indicating whether the protective cover is closed which is detected by one or more of a plurality of sensors provided in the electronic device, such as a hall sensor, an image sensor, and a proximity sensor, and identifies whether the electronic device is in a non-contact mode. When the electronic device is in the non-contact mode, the processor 122 maintains the transmission power at a default power value without reducing the transmission power, thereby preventing performance loss in the electronic device. The electronic device may inadvertently recognize an object due to a nearby device or the user's environment but the transmission power is maintained at the default power value when the electronic device is in the non-contact mode. The audio processing unit 133 may provide an audio interface between a user and the electronic device 100 through a speaker 134 and a microphone 135.

The communication system 136 enables the electronic device 100 to connect to an external device using one or a plurality of antennas. The communication system 136 transmits and receives wireless signals for voice and video calls, SMS messages, MMS messages and data communication to and from a terminal, such as a smart phone having a telephone number which is input to the electronic device 100, a tablet PC or another portable device. The sub-communication system 140 may include a wireless LAN module 141 and a near field communication module 142. The wireless LAN module 141 may connect to the Internet in a wireless method in a place at which an Access Point (AC) is mounted based on control of the processor. The wireless LAN module 141 supports a wireless LAN protocol IEEE 802.11x created and maintained by the Institute of Electrical and Electronics Engineers (IEEE). The near field communication module 142 may perform wireless near field communication between the electronic device 100 and an external device. The near field communication may comprise, Bluetooth communication, an Infrared Data Association (IrDA) communication, and Near Field Communication (NFC).

The I/O control unit 130 may provide an interface between an input/output device, such as the display unit 131 and the input device 132, and the peripheral interface 123. The input device 132 provides input data generated by user selection to the processor unit 120 through the input/output processing unit 130. For example, the input device 132 may be configured by including control buttons for control of the electronic device 100 or by a keypad. The input device 132 may be implemented by the display unit 131 via a capacitive type touchscreen or a resistive type touchscreen for example. The display unit 131 may receive the status information of the electronic device 100, in response to input by the user or may receive moving pictures or still pictures, for example, from the processor unit 120 for display through the input/output processing unit 130. For example, the processor 122 may control display on the display unit 131 in response to settings information corresponding to a touch recognition mode (a direct touch mode in a state where the protective cover is open or a cover touch mode in a state where the protective cover is closed) associated with a program that is being executed in the electronic device 100.

When the display unit 131 is implemented using a touchscreen input device 132, the touchscreen may perform the function of the display unit 131 and the function of the input device 132. The hall sensor 137 may be mounted to detect the magnetic force of the magnet disposed in the protective cover 210. The hall sensor 137 may detect the magnetic force of the magnet and provide a detected signal to the processor 122 when the protective cover is closed. The proximity sensor 138 may detect the closing of the protective cover and an object in the display direction. The proximity sensor may detect that the protective cover or the object in the display direction is in proximity of the touchscreen and provide the detected signal to the processor 122. The image sensor 139 may also detect that the protective cover is in proximity to the touchscreen and provide the detection signal to the processor 122 when the protective cover is closed. In addition, different types of sensors capable of detecting an object may be used to detect the proximity of an object in the display direction.

Figure 5:
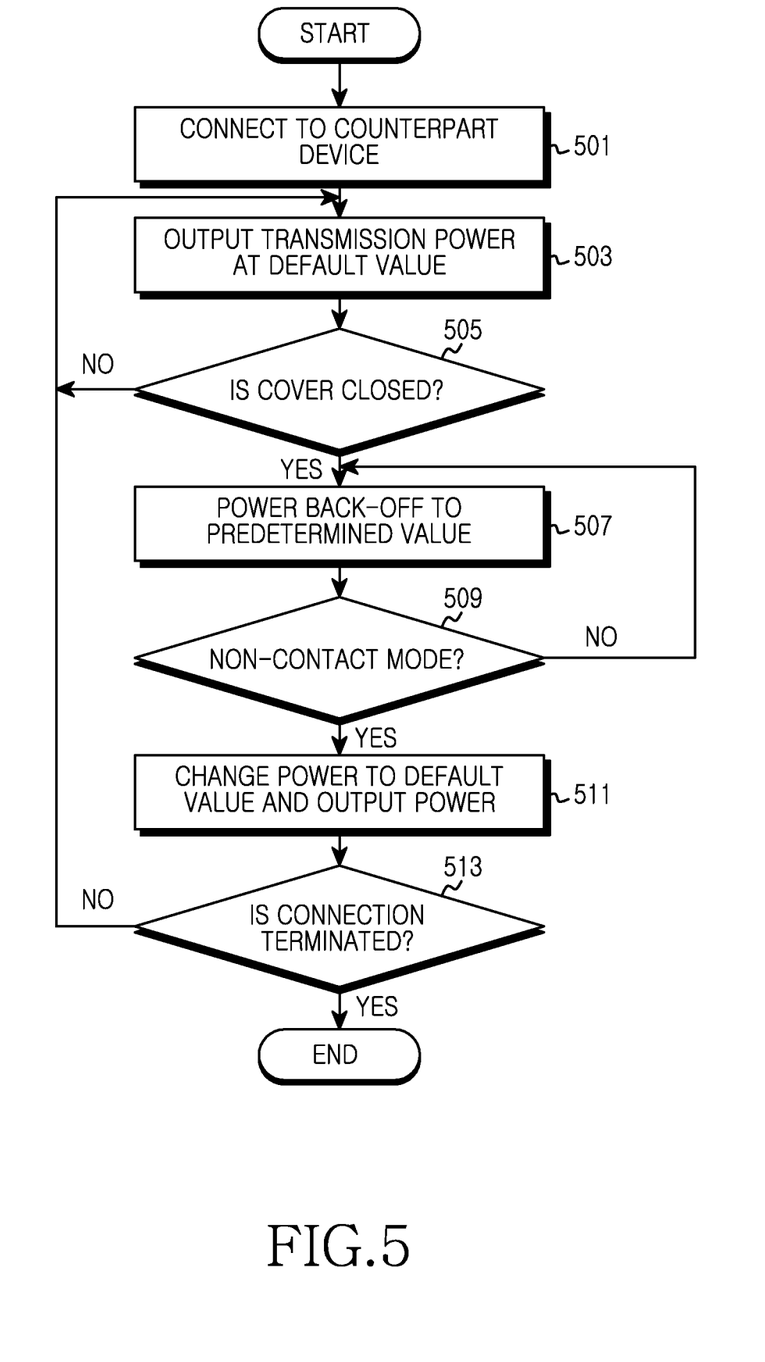
FIG. 5 shows a flowchart of a method for operating an electronic device for transmission power control according to invention principles.

FIG. 5 shows a flowchart of a method for operating an electronic device for transmission power control. The electronic device performs operation 501 to determine whether the electronic device is communicatively connected to another device. The other device is able to communicate with the electronic device via different communication methods, such as voice communication, video communication, or communication for data transmission and reception. The electronic device may output transmission power at a first power value in operation 503. In operation 505, the electronic device determines whether a cover is closed by using a proximity sensor and/or an image sensor. A sensor may detect the magnetic force of a magnet included in the protective cover by a hall sensor included in the electronic device. Alternatively, an electronic chip included in the protective cover may detect the cover is closed in response to a cover object generated magnetic or electric field. An object may also be detected by an image sensor as being in the proximity of the device.

In operation 505, if it is determined the cover is closed or an object in the device proximity is detected, the electronic device may output the transmission power, which was kept at the first power value, at a second power value in operation 507. In the case of a smart phone, the first power value is about 23 dBm to about 29.5 dBm and the second power value is about 18 dBm to about 22.5 dBm, thus reducing the transmission power. For example, the transmission power is decreased by about 5 dBm to 7 dBm. The power back-off operation is performed because the detection of an object around the electronic device is recognized as indicating the electronic device is in the proximity of a user body and the protective cover is closed. An illumination sensor, proximity sensor and/or image sensor does not distinguish between when the protective cover is closed or when an object is adjacent to the electronic device as for example, when a user head approaches the electronic device. In addition, the hall sensor detects that the protective cover is closed. However, the electronic device may be in proximity of the user body during a voice call even where the protective cover is closed so the power is reduced to the second power value.

The electronic device determines whether the electronic device is in a non-contact mode in operation 509. When it is determined that the electronic device is in the non-contact mode when the protective cover is closed, the electronic device changes the transmission power to the first power value and outputs the first power value in operation 511. The non-contact mode is a mode in which it is identified that the electronic device is not in contact with a human body even though the protective cover is closed or the object is detected around the electronic device, and may include a Bluetooth mode, a speaker-phone mode, and an ear-phone mode, which enables voice communication to be performed using a non-contact method. The voice communication may include a communication comprising an infrared communication mode, a NFC mode, wireless LAN or Zigbee, CDMA or LED communication. In operation 513, the electronic device may determine whether connection to another electronic device is terminated and when the connection is not terminated, returns to operation 503. Although the protective cover is closed or an object is detected in the proximity of the electronic device, the device determines whether it is operating in non-contact mode, and performs communication selectively at the second power value, thereby reducing a specific absorption rate, and preventing unnecessary performance loss.

In FIG. 5, when the protective cover is closed or an object in proximity of the electronic devise is detected, the transmission power is decreased to the second power value to perform communication. In an embodiment, the operation of determining whether the electronic device is in the non-contact mode is performed before performance of power back-off and when the electronic device is in the non-contact mode.

Figure 7A:
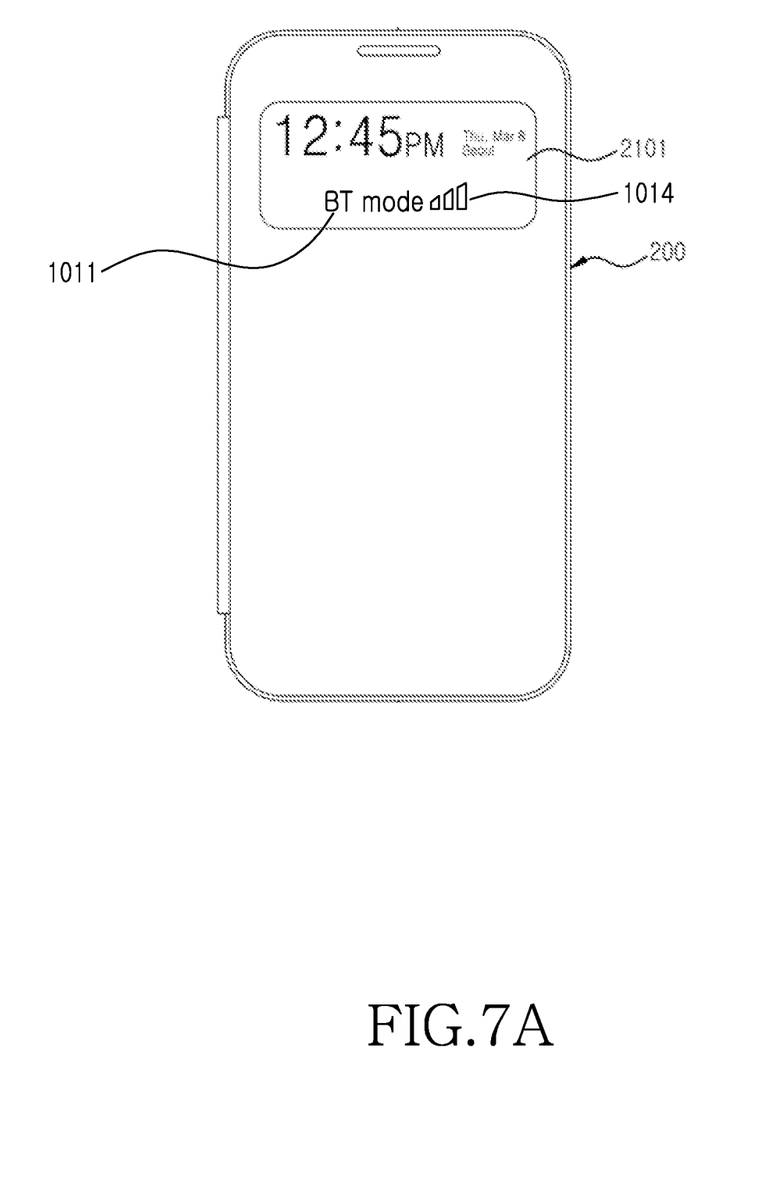
FIG. 7A and FIG. 7B show displays of transmission power associated information through a window of a protective cover according to invention principles.
Figure 7B:
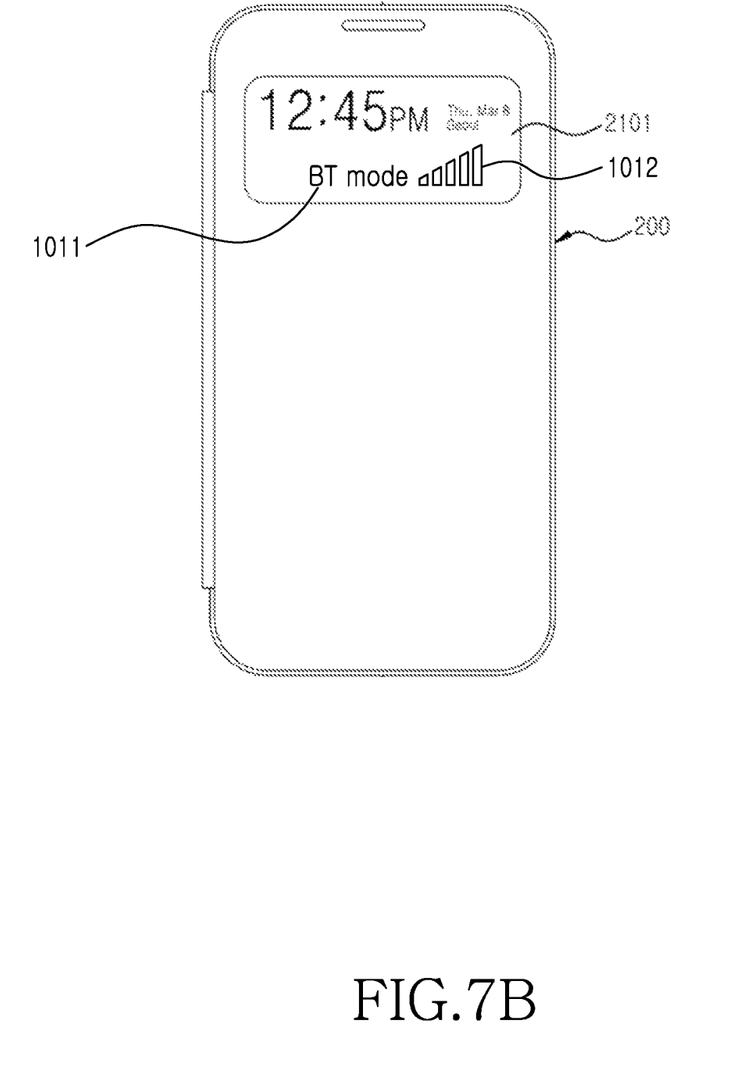

FIGS. 7A and 7B show displays of transmission power associated information through a window of a protective. As illustrated in FIG. 7B, an operation mode of the electronic device and a transmission power strength may be displayed on the touchscreen. FIG. 7A shows a communication state involving communication at the second power value when the protective cover is closed with reduced transmission power. In FIG. 7A, an indicator 1012 represents the transmission power that is kept at the second power value although the electronic device detects that the protective cover is closed and enters the non-contact mode (indicator 1011). FIG. 7B indicator 1014 indicates the transmission power is kept at the first power value when the electronic device is in the non-contact mode (indicator 1011) even though the protective cover is closed.

Figure 6:
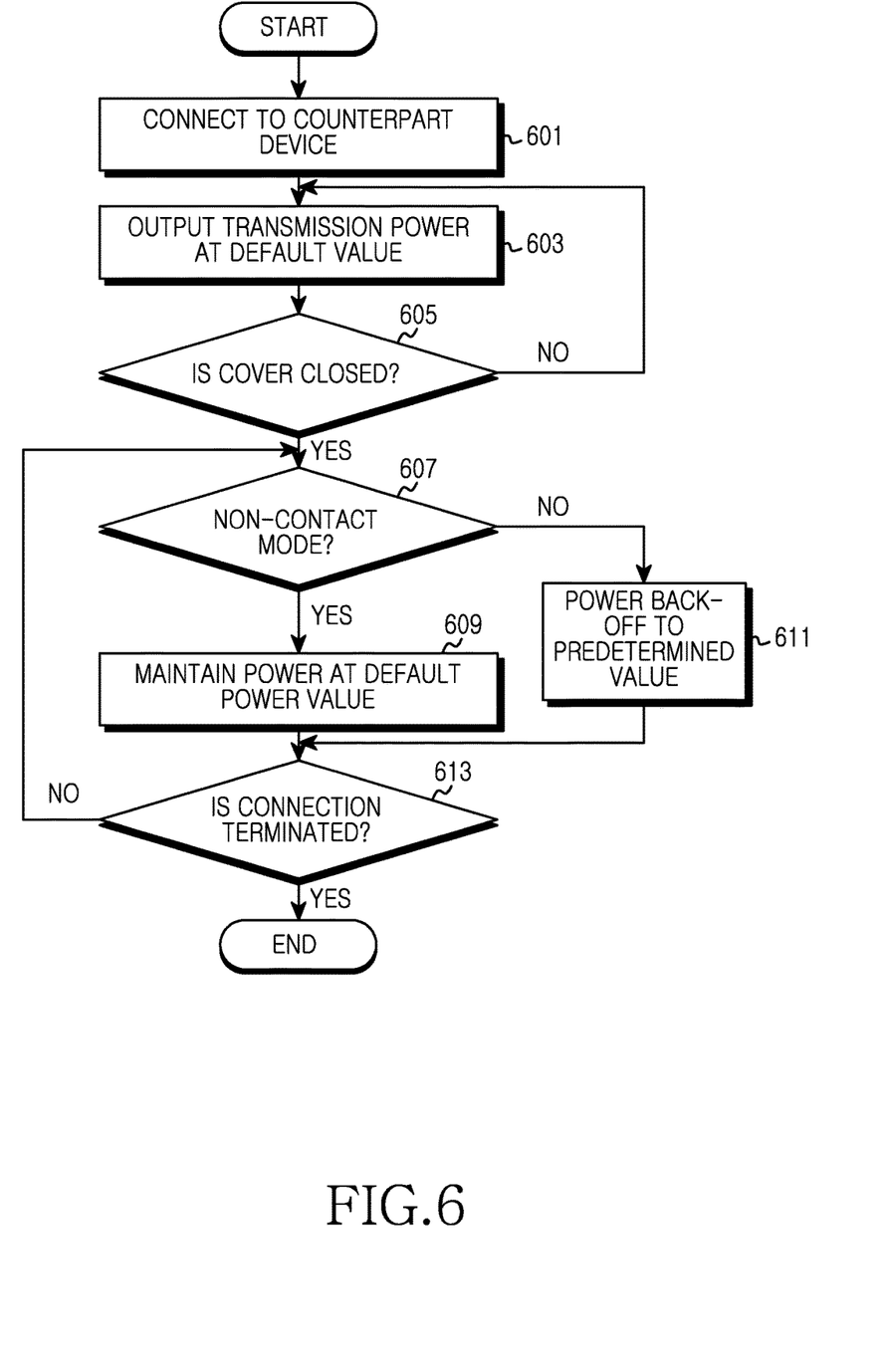
FIG. 6 is a flowchart of a method for operating an electronic device for transmission power control according to invention principles.

FIG. 6 shows a flowchart of a method for operating an electronic device for transmission power control. In operation 601, the electronic device determines whether the electronic device is communicatively connected to a counterpart device. The counterpart device is able to communicate with the electronic device according to various communication methods, such as voice communication, video communication, or communication for data transmission and reception. Thereafter, the electronic device may output a transmission power at a predetermined first power value in operation 603.

In operation 605, the electronic device determines whether a cover is closed or an object is detected in proximity of the electronic device in a manner as previously described. In operation 605, when the cover is closed or the object is detected in proximity of the electronic device, the electronic device determines whether a current mode is a non-contact mode in operation 607 as previously described. In operation 607, when it is identified that an operation mode is the non-contact mode, the electronic device in step 609 maintains the transmission power at the first power value. In operation 613, the electronic device determines whether connection to the counterpart electronic device is terminated. When the connection is not terminated, operation 607 is iteratively repeated. When in operation 607 it is determined the electronic device is not in the non-contact mode, the electronic device may output the transmission power at a predetermined second output value reducing specific absorption rate with respect to the human body.

According to above-described embodiments, the transmission power is controlled selectively depending in response to data identifying a function that is being performed. The system determines where an electronic device is in proximity to a head and advantageously reduces specific absorption rate and prevents unnecessary decrease in transmission power to improve the performance of the electronic device.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

What is claimed is:

1. A method employed by an electronic device, comprising:
    reducing a power transmitted by the electronic device when a proximity detector in the electronic device detects that an object is proximate to the electronic device and a Hall sensor detects that a cover attached to the electronic device is open;
        when the Hall sensor detects that the cover attached to the electronic device is closed, determining whether the electronic device is engaged in NFC transmission;
        reducing the power transmitted by the electronic device when the determination is negative; and
        maintaining a level of power transmitted at a default power level when the determination is positive.

2. The method of claim 1, further comprises,
    when the Hall sensor detects that the cover is closed, determining whether the electronic device is engaged in an infrared communication,
    reducing the power transmitted by the electronic device when the determination that the electronic device is engaged in the infrared communication is negative; and
    maintaining a level of power transmitted at the default power level when the determination that the electronic device is engaged in the infrared communication is positive.

3. The method of claim 1, further comprises,
    when the Hall sensor detects that the cover is closed, determining whether the electronic device is engaged in a wireless LAN communication,
    reducing the power transmitted by the electronic device when the determination that the electronic device is engaged in the wireless LAN communication is negative; and
    maintaining a level of power transmitted at the default power level when the determination that the electronic device is engaged in the wireless LAN communication is positive.

4. The method of claim 1, further comprises,
    when the Hall sensor detects that the cover is closed, determining whether the electronic device is engaged in a Zigbee communication,
    reducing the power transmitted by the electronic device when the determination that the electronic device is engaged in the Zigbee communication is negative; and
    maintaining a level of power transmitted at the default power level when the determination that the electronic device is engaged in the Zigbee communication is positive.

5. An electronic device comprising:
    a housing including a display; and
    at least one processor included within the housing,
    a cover attached to the housing, wherein the cover includes a magnet;
    a proximity detector configured to detect an object proximate to the electronic device;
    a Hall sensor configured to detect that the cover covers at least a portion of the display;
    wherein the at least one processor controls power wherein:
        when the Hall sensor detects the cover is open and the proximity detector detects the object in proximity to the electronic device reducing the power by a predetermined value;
        when the Hall sensor detects the cover is closed:
            maintaining the power at a default power value when the electronic device is engaged in a Near Field Communication (NFC) transmission; and
            otherwise reducing the power by the predetermined value.

6. The electronic device of claim 5, wherein the cover includes one or more transparent windows.

7. The electronic device of claim 6, wherein the processor enables the display to display status information of the electronic device through the transparent window when the cover is closed and encompasses at least a portion of the electronic device.

8. The electronic device of claim 7, wherein the status information comprises at least one of, battery charge remaining information, weather information, time information, message reception and confirmation information, current mode indication information and transmission power information.

9. The electronic device of claim 5, wherein the default power level is between 23 dBm and 29.5 dBm and reducing the power by the predetermined value comprises reducing the power level to between 18 dBm and 22.5 dBm.

\* \* \* \* \*